(12) United States Patent
Mullis

(10) Patent No.: US 9,539,529 B2
(45) Date of Patent: Jan. 10, 2017

(54) BACKWASH RECLAMATION METHOD

(76) Inventor: Stanton Jeffery Mullis, Jesup, GA (US)

( * ) Notice: Subject to any disclaimer, the term of this patent is extended or adjusted under 35 U.S.C. 154(b) by 1147 days.

(21) Appl. No.: 13/537,733

(22) Filed: Jun. 29, 2012

(65) Prior Publication Data

US 2014/0001128 A1  Jan. 2, 2014

(51) Int. Cl.
*B01D 35/02* (2006.01)
*B01D 24/46* (2006.01)
*E04H 4/16* (2006.01)

(52) U.S. Cl.
CPC ..................... *B01D 35/02* (2013.01)

(58) Field of Classification Search
None
See application file for complete search history.

(56) References Cited

U.S. PATENT DOCUMENTS

| | | | | |
|---|---|---|---|---|
| 2,233,218 A | * | 2/1941 | Moore | 210/712 |
| 2,979,733 A | * | 4/1961 | Saint Clair et al. | 210/167.12 |
| 3,207,312 A | * | 9/1965 | Griswold | 210/141 |
| 3,365,064 A | | 1/1968 | Horan | |
| 3,491,884 A | * | 1/1970 | Baker | 210/167.13 |
| 3,581,895 A | * | 6/1971 | Howard et al. | 210/108 |
| 4,194,975 A | | 3/1980 | Baker | |
| 4,545,905 A | * | 10/1985 | Poe | 210/136 |
| 4,574,048 A | * | 3/1986 | van den Broek | 210/136 |
| 4,607,399 A | * | 8/1986 | Yovanofski | 4/508 |
| 5,367,723 A | * | 11/1994 | Pleva et al. | 4/508 |
| 5,459,886 A | * | 10/1995 | Payne et al. | 4/508 |
| 5,505,844 A | * | 4/1996 | Porter | 210/95 |
| 6,497,814 B1 | | 12/2002 | Alexander | |
| 7,354,512 B1 | * | 4/2008 | Barbe | 210/167.1 |
| 7,468,134 B2 | * | 12/2008 | Hoang | 210/617 |
| 2006/0151366 A1 | * | 7/2006 | Hoang | 210/95 |
| 2009/0277848 A1 | * | 11/2009 | Slade et al. | 210/793 |
| 2010/0270173 A1 | * | 10/2010 | Anderson et al. | 205/751 |
| 2014/0001128 A1 | * | 1/2014 | Mullis | 210/793 |

FOREIGN PATENT DOCUMENTS

EP       1274326       1/2003

* cited by examiner

*Primary Examiner* — Robert James Popovics
(74) *Attorney, Agent, or Firm* — J. Wiley Horton

(57) ABSTRACT

A method for reclaiming and reusing a substantial portion of the waste water creating during the backwashing of a pool filter. The system uses a separate floating debris filter to remove solids before pumping the waste water into a sediment retention tank. The waste water is stored in the sediment retention tank for about a day, during which time the suspended solids settle to the bottom. The water in the sediment retention tank is then pumped back into the circulating pool system.

19 Claims, 8 Drawing Sheets

BACKWASH RECLAMATION METHOD

CROSS-REFERENCES TO RELATED APPLICATIONS

Not applicable.

STATEMENT REGARDING FEDERALLY SPONSORED RESEARCH OR DEVELOPMENT

Not applicable.

MICROFICHE APPENDIX

Not applicable

BACKGROUND OF THE INVENTION

1. Field of the Invention

The present invention relates generally to the field of swimming pool filtration. More specifically, the invention comprises a method for reclaiming an reusing most of the water used to "backwash" a pool filter.

2. Description of the Related Art

Swimming pools generally include a filtration system for removing contaminants. The pool water is forced through such filters for a substantial part of each day. One common form of filter is a sand filter. A sand filter is formed by partially filling a pressure vessel with sand filtration media. Pool water is forced through the filtration media and the sand traps the unwanted contaminants.

As the filtration media becomes more saturated with contaminants, the pressure differential across the filter rises. The filter is in effect becoming clogged by the contaminants it is designed to remove. Water flow is progressively reduced by the clogging of the filtration media and the filter becomes progressively less efficient. The filtration also tends to aggregate resulting in the formation of water "tunnels" that allow flow to pass through the media without being effectively filtered. In order to eliminate this problem, a sand filter must periodically be "backwashed."

"Back washing" generally refers to the process of reversing the flow through the filtration media in order to stir the media and remove the trapped contaminants. Air injection may be added during the backwashing process to lift the filter media off the bottom of the pressure vessel and promote agitation. The water carried through the filter during backwashing is dumped out of the recirculating pool filtration system through a "backwash line." This water is often discharged onto a lawn area surrounding the pool. It may also be dumped into a sewer line. In any event, the dumped water contains undesirable contaminants. It contains the particles the sand filter is intended to remove. It also often contains chlorine and other potentially harmful pool chemicals.

There is an increasing recognition that backwash waste water should not be dumped into the area surrounding a pool nor into the sewer system serving the area. Some regulating authorities are now passing rules prohibiting such dumping. Thus, there is a need for a system which reduces the unwanted dumping of backwash waste water. The present invention proposes such a system.

BRIEF SUMMARY OF THE INVENTION

The present invention comprises a method for reclaiming and reusing a substantial portion of the waste water creating during the backwashing of a pool filter. The system uses a separate floating debris filter to remove solids before pumping the waste water into a sediment retention tank. The waste water is stored in the sediment retention tank for about a day, during which time the suspended solids settle to the bottom. The water in the sediment retention tank is then pumped back into the circulating pool system.

The sediment collected in the sediment retention tank is removed. The floating debris collected in the floating debris filter is also removed. These solids are then disposed of. An internal spray head is preferably provided inside the sediment retention tank to clean the tank's interior. The timing and sequencing of the operations may be conducted manually, automatically, or using a combination of manual and automatic operations.

REFERENCE NUMERALS IN THE DRAWINGS

| | | | |
|---|---|---|---|
| 10 | backwash reclamation system | 12 | floating debris filter |
| 14 | sediment retention tank | 16 | sand filter |
| 18 | pump | 20 | intake line |
| 22 | discharge line | 24 | return line |
| 26 | multi-port valve | 27 | tee |
| 28 | selector lever | 30 | backwash line |
| 32 | first union | 34 | first valve |
| 36 | second valve | 38 | third valve |
| 40 | fourth valve | 42 | shower bead |
| 44 | lid | 46 | shower line |
| 48 | tee | 50 | fill line |
| 52 | tee | 54 | tank line |
| 56 | drain line | 58 | second union |
| 60 | pump intake line | 62 | jacket |
| 64 | intake tube | 66 | intake slit |
| 68 | filter sock | 70 | male thread |
| 72 | threaded receiver | 74 | filter outlet |
| 76 | filter inlet | 78 | pump discharge line |
| 80 | high level sensor | 82 | low level sensor |
| 84 | logic controller | 86 | tank line intake |
| 87 | UV controller | 88 | UV chamber |
| 90 | cartridge filter | 92 | flow switch |
| 94 | recirculation intake | | |

DETAILED DESCRIPTION OF THE INVENTION

The inventive method can be carried out using a virtually endless variety of components and connections. FIGS. 1-8 illustrate preferred embodiments. However, the invention is by no means confined to the embodiments disclosed.

Figure 1:
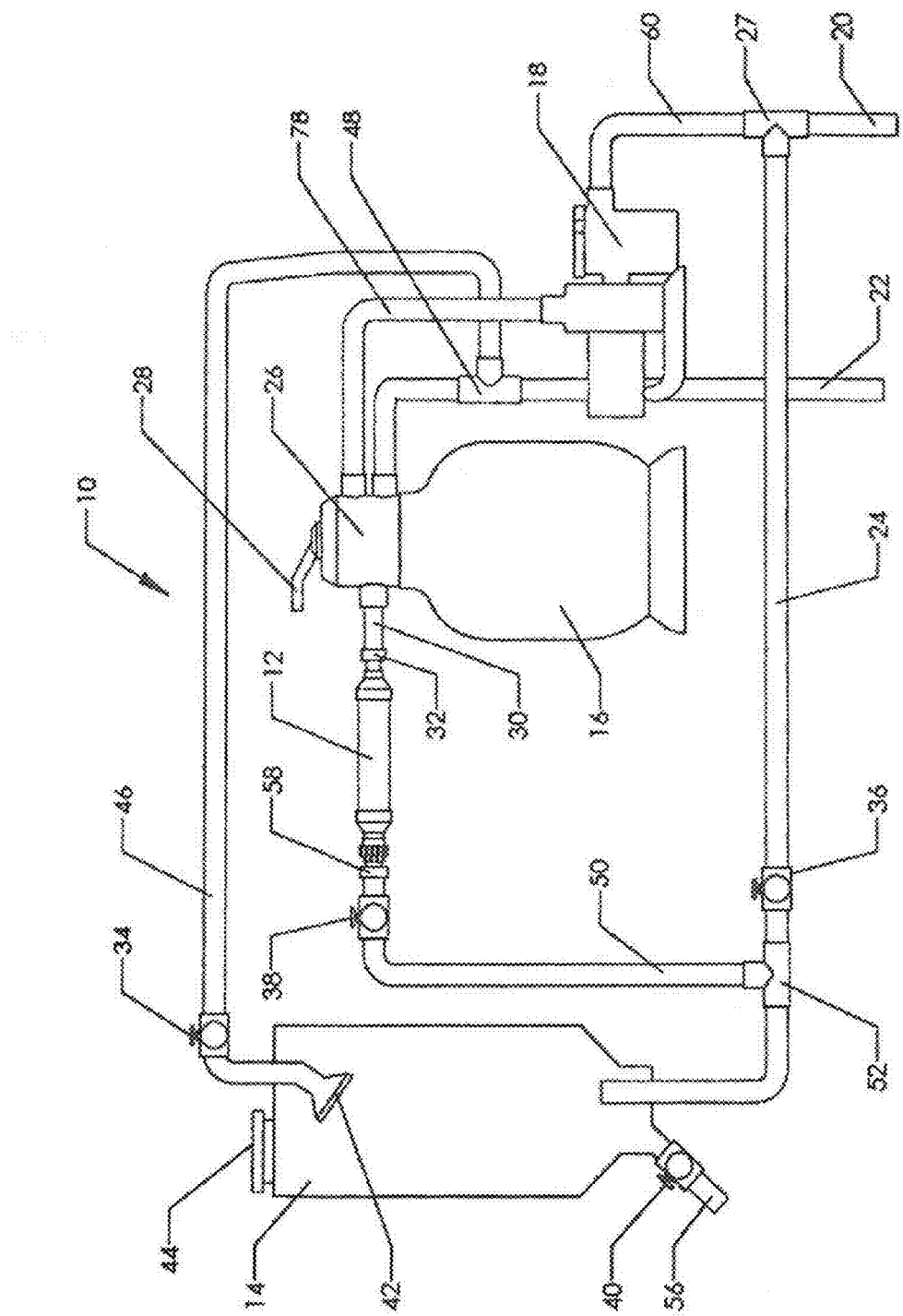
FIG. 1 is an elevation view, showing an apparatus configured to carry out the present inventive method.

FIG. 1 shows pump 18 connected to a conventional sand filter 16. The pump draws in water (typically from a swimming pool) though pump intake line 60. Pump intake line 60 is fed through tee 26, which draws from intake line 20 (typically connected to the swimming pool) and/or return line 24. The pump pressurizes the water and feeds it to the sand filter through pump discharge line 78.

In conventional operation, the water is fed through the sand filter and returned to the pool via discharge line 22. Selector lever 28 on multi-port valve 26 determines how the sand filter operates. Most of the time this lever will be set to direct the pressurized water from the pump through the sand filter media and then back out to the pool through discharge line 22.

Selector lever 28 may also be set to "backwash." in that mode the water flow through the sand filter is reversed and the exit water flows out through backwash line 30. In the prior art, backwash line 30 simply discharges the water into the ground or into a nearby sewer. However, in the present inventive method, backwash line 30 is connected to other components which ultimately carry the effluent to sediment retention tank 14.

An intermediate filter is preferably used to remove floating debris from the water being discharged out the backwash line. Floating debris filter 12 is provided for this purpose. It is placed in the backwash line by connecting first union 12 and second junction 58. The unions are provided so that floating debris filter 12 can be removed and opened for cleaning—as will be explained subsequently.

The water flowing out of floating debris filter 12 flows through third valve 38 and then into tee 52, where it may be directed through tank line 54 or return line 24, depending on the state of second valve 36. Return line 24 connects to tee 26, which feeds into pump intake line 60.

Shower line 46 selectively applies pressurized water to shower head 42 located in sediment retention tank 14 (drawing pressurized water from tee 48 located in discharge line 22). The sediment retention tank is also provided with drain line 56. Flow through this drain line is controlled by fourth valve 40.

Figure 2:
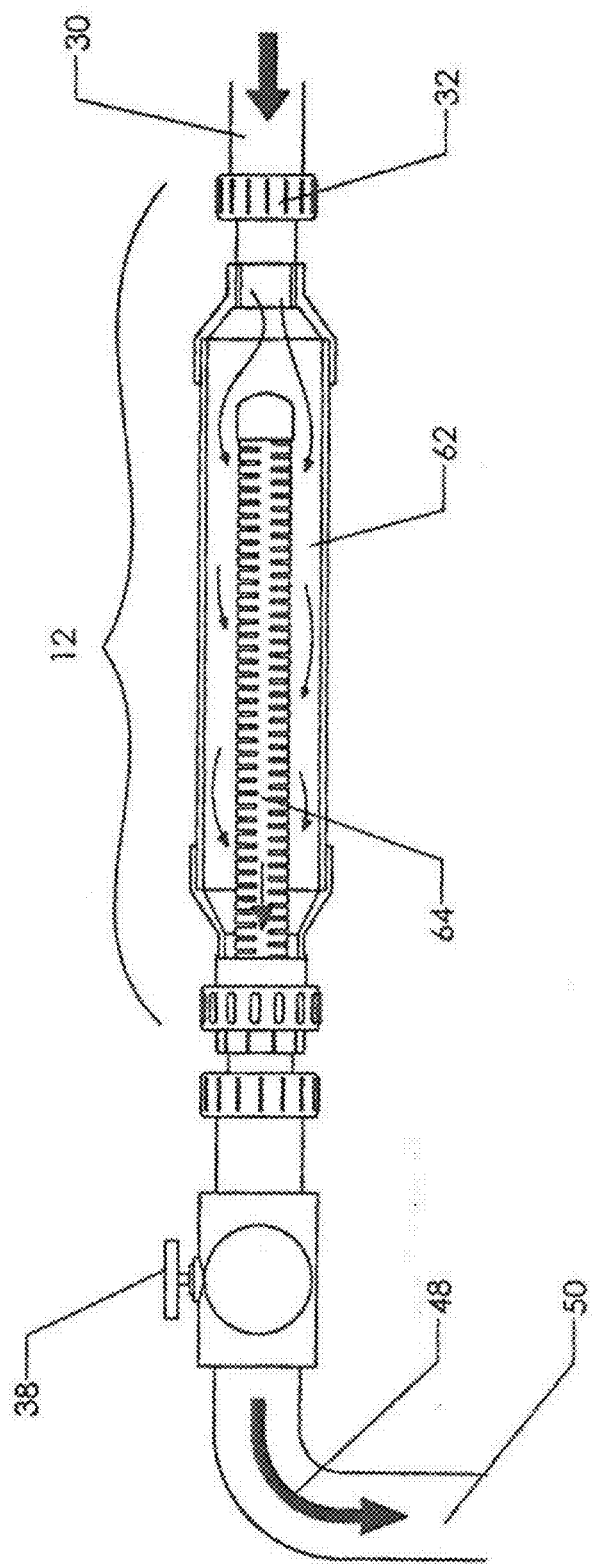
FIG. 2 is a detailed elevation view, showing the floating debris filter.

FIG. 2 shows some internal features of floating debris filter 12 in simplified form. The backwash water flows in through back wash line 30 and through first union 32. It then flows into and floods jacket 62. Jacket 62 surrounds intake tube 64—a hollow tube having a plurality of holes or slits that admit the flow into its interior. The water flowing out of the intake tube then flows through third valve 38 and into fill line 50. The slits or holes in the intake tube are designed to admit the water while blocking large pieces of floating debris.

Figure 3:
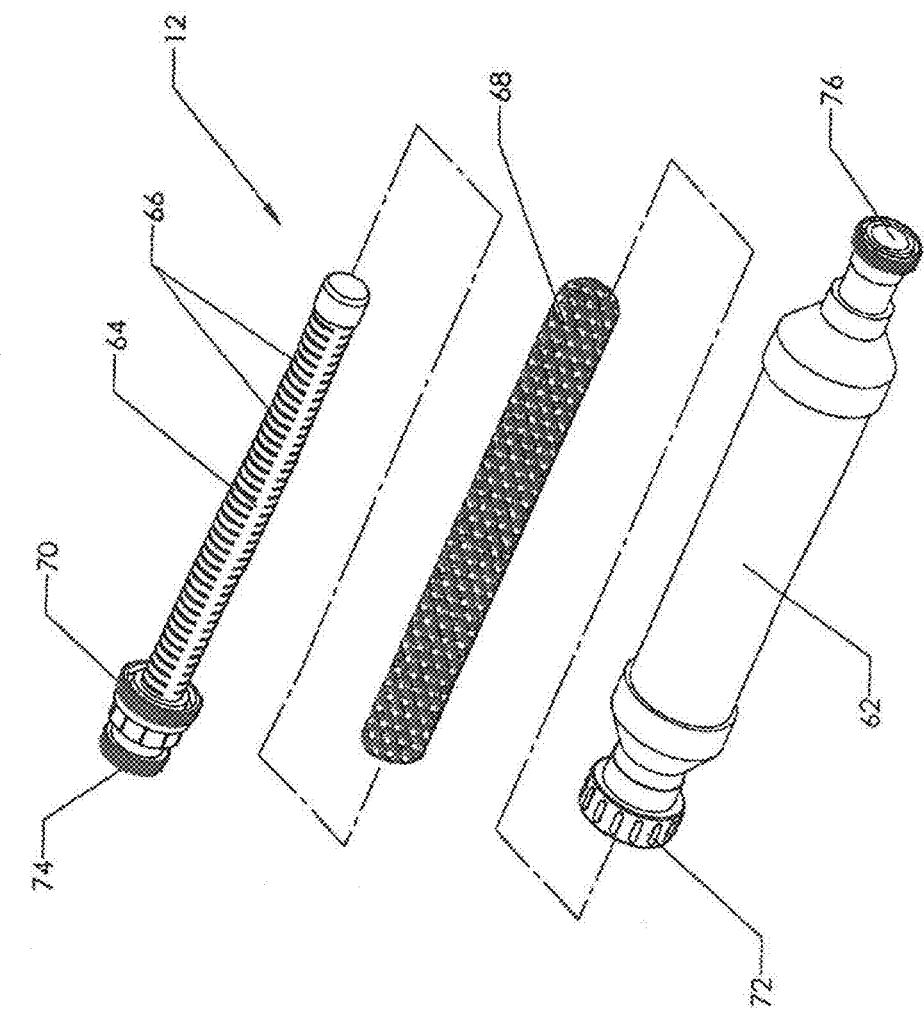
FIG. 3 is an exploded perspective view, showing internal details of the floating debris filter.

FIG. 3 is an exploded perspective view showing internal details of one embodiment of floating debris filter 12. The reader will observe that intake tube 64 includes a plurality of overlapping intake slits 66. This configuration is similar to the intake tube used on a groundwater well and serves basically the same purpose preventing the passage of large bits of floating debris).

A filter sock 68 is preferably provided. This fits over intake tube 64 and is held in position by friction or other suitable means. Jacket 62 is placed over the assembly of filter sock 68 and intake tube 64. It is connected using any suitable means. In this example, male thread 70 is threaded into threaded receiver 72. The water flows into the assembly through filter inlet 76 and flows out through filter outlet 74.

The assembly of FIG. 3 is removed from the complete system of FIG. 1 by unscrewing first union 32 and second union 58. Turning back to FIG. 3—the floating debris filter may her be disassembled by unscrewing male thread 70 from threaded receiver. Once disassembled the user may remove any solid debris trapped in the filter. Filter sock 68 is preferably made removable as well so that it may be cleaned in running water.

Figure 4:
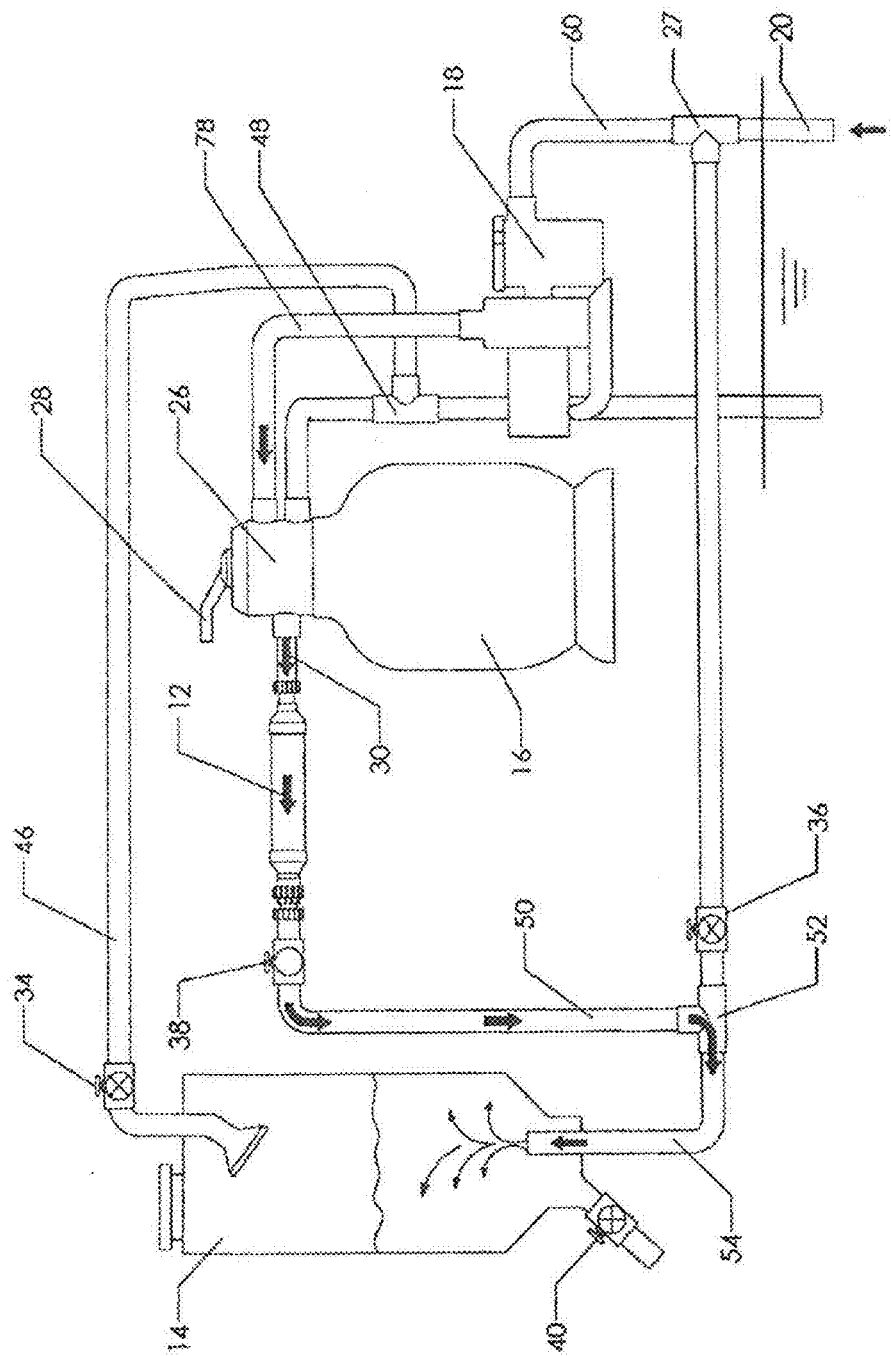
FIG. 4 is an elevation view, showing the operation of the apparatus of FIG. 1.

The operation of the components thus disclosed will now be described with reference to FIGS. 4 through 7. In FIG. 4, the backwash cycle is started by setting multi-port valve 26 to the "backwash" position. In this position the sand filter discharges backwash water through backwash line 30. The backwash water flows through floating debris filter 12—which traps any large pieces of floating debris. Second valve 36 is in the closed position and third valve 38 is in the open position so that the water flowing out of the floating debris filter enters tee 52 and flows through tank line 54 to fill sediment retention tank 14. Fourth valve 40 is in the closed position so the backwash waste water remains in the sediment retention tank.

The backwash cycle is preferably maintained until sediment retention tank 14 is about ¾ full. Multi-pod valve 26 is then placed in the "rinse" position, which also discharges water through backwash line 30. The multi-port valve is preferably maintained in the "rinse" position until the sediment retention tank is full or substantially fall.

Figure 5:
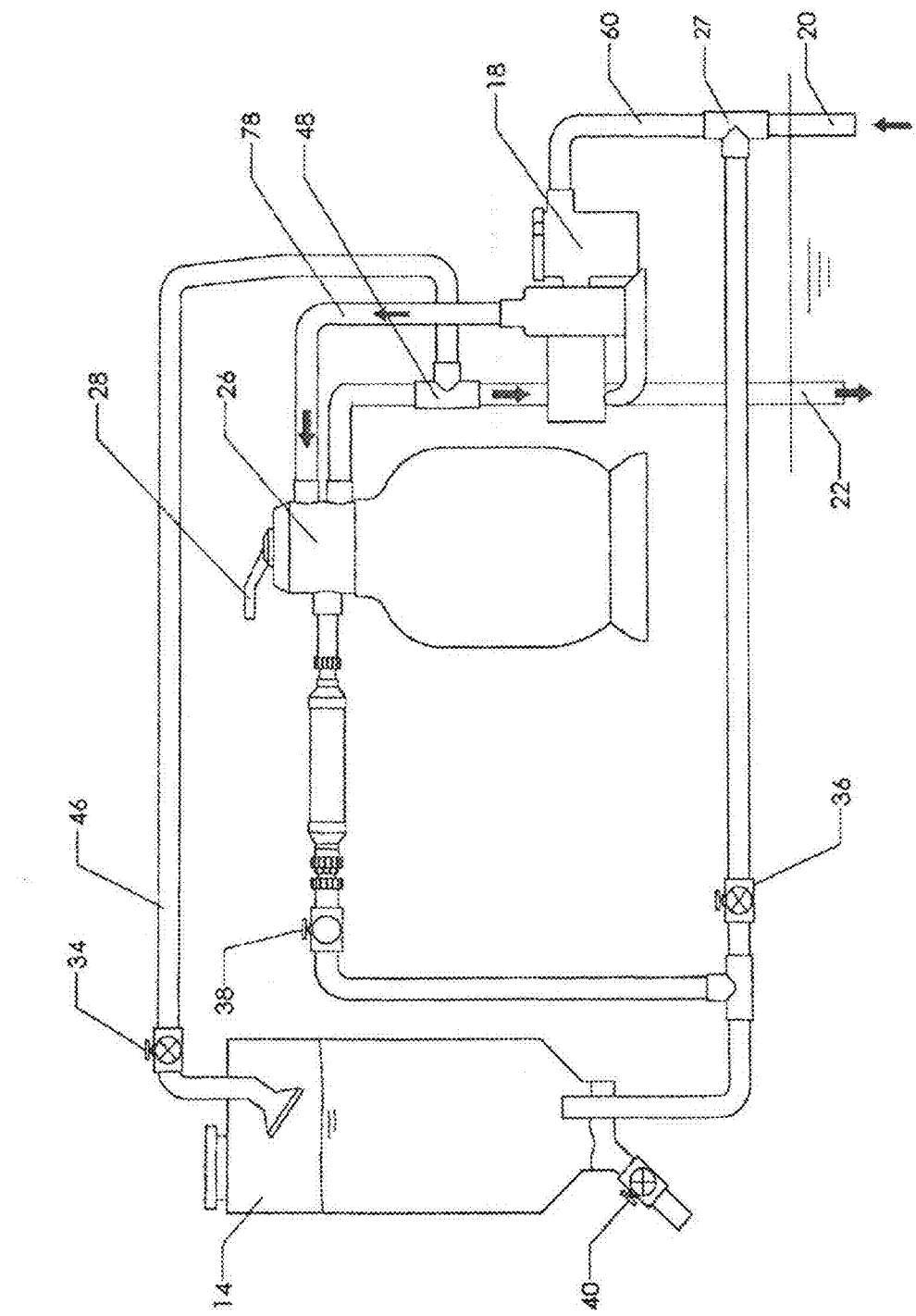
FIG. 5 is an elevation view, showing the operation of the apparatus of FIG. 1.

Multi-port valve 26 is then switched to the "filter" position. This configuration is shown in FIG. 5. Pool water is drawn in through intake line 20, pumped through the sand filter, and returned to the pool through discharge line 22. This is the standard operation of the circulating pool filtration system. Normal filtration continues while the contents of the sediment retention tank are allowed to settle.

The concept is to allow the suspended sediments in the backwash effluent to settle to the bottom of the sediment retention tank—with relatively clean water remaining in the balance of the tank. The time required for this operation varies according to the quality of the suspended sediments. However, allowing the tank's contents to sit for about one day is nearly always sufficient to complete the sedimentation process.

Figure 6:
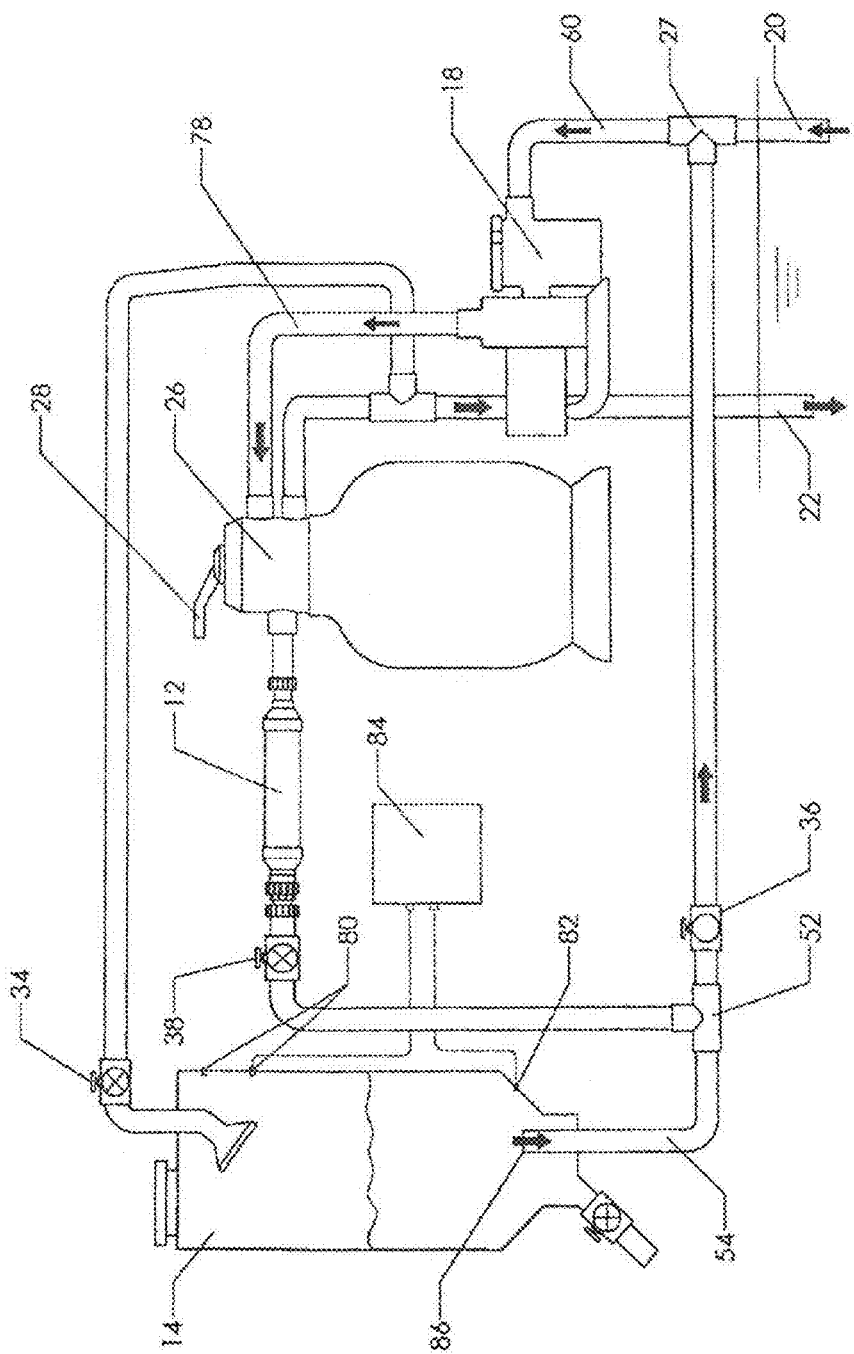
FIG. 6 is an elevation view, showing the operation of the apparatus of FIG. 1.

Once the tank contents are separated, the process moves on to the stage depicted in FIG. 6. First valve 34 is in the closed position, third valve 38 is in the closed position, and fourth valve 40 is in the closed position. However, second valve 36 is moved to the open position. The multi-port valve is positioned, to its normal "filter" position. Water within the sediment retention tank is then drawn into tank line 54, through return line 24, and into tee 27. From that point it is pulled into the pump through pump intake line 60. The water from the sediment retention tank is thereby placed back into the conventional pool filtration circulation loop. It passes through the sand filter then out discharge line 22 and back into the pool.

The reader will observe that tank line 54 has tank line intake 86. The intake may assume many forms, but it should be designed so that it lies above the sediment that has settled to the bottom of the tank. In this way the tank line intake only draws in clean water and does not tend to draw in any of the accumulated sediment. Those skilled in the art will know that the intake may assume many forms—including a slitted tube such as used in floating debris filter 12.

Figure 7:
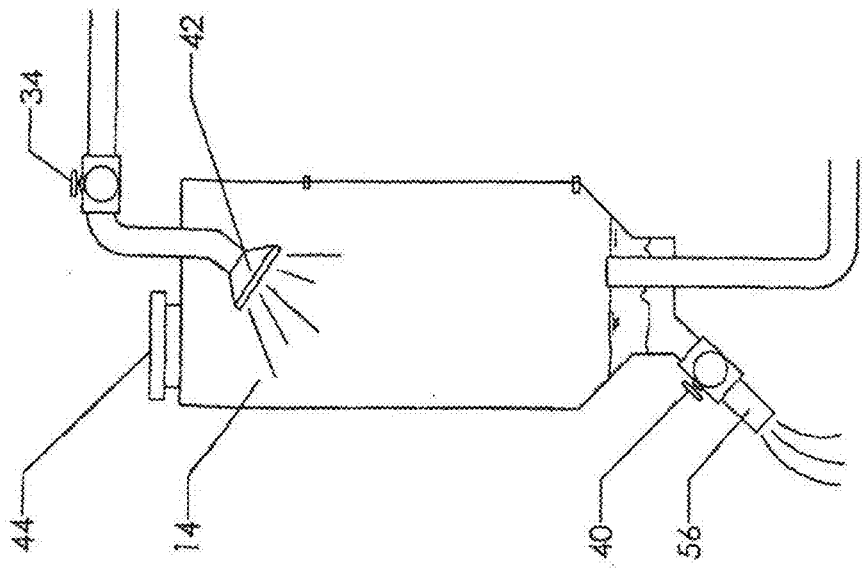
FIG. 7 is an elevation view, showing the operation of the apparatus of FIG. 1.

The water level within the sediment tank should only be drawn down to the level of the intake. FIG. 7 illustrates the final step in the process. When a significant amount of sediment has accumulated in the tank, fourth valve 40 is opened to allow the sediment to our out of drain line 56. The sediment is preferably captured in a container so that it can be properly disposed of.

First valve 34 may also be opened at any time to allow pressurized water to flow into shower head 42 and rinse the interior of the sediment retention tank. Depending on condition, it may be possible to run through several backwash cycles before it is necessary to empty sediment from the retention tank. Removable lid 44 is provided so that the tank may be thoroughly scrubbed and inspected from time to time.

It is helpful to provide features which allow the monitoring of the water level within the sediment retention tank so that it may be properly filled and emptied. A simple sight glass can be provided for this purpose. The tank could be molded of transparent or translucent material. Alternatively, liquid level sensors can be provided. FIG. 6 shows an embodiment incorporating high level sensor 80 and low level sensor 82. These are preferably electrical devices providing output signals. The output signals can trigger simple light displays (such as a light marked "flail" and a light marked "empty"). In a more complex embodiment, the level sensors can feed information to logic controller 84 (a programmable logic controller, computer, or similar device). A logic device could be used to automate the entire process—provided that automated valves are used. The logic device could even monitor the pressure differential through the sand filter to determine when to initiate the backwash cycle. Of course, it is also possible to leave portions of the process manual while automating others. For example, the user could start the backwash cycle with the logic device then assuming, control of monitoring the sediment retention tank and sequencing the valves to achieve the proper operation. Additional liquid level sensors could be furnished to provide a ¾ full reading or other desired measurement.

Figure 8:
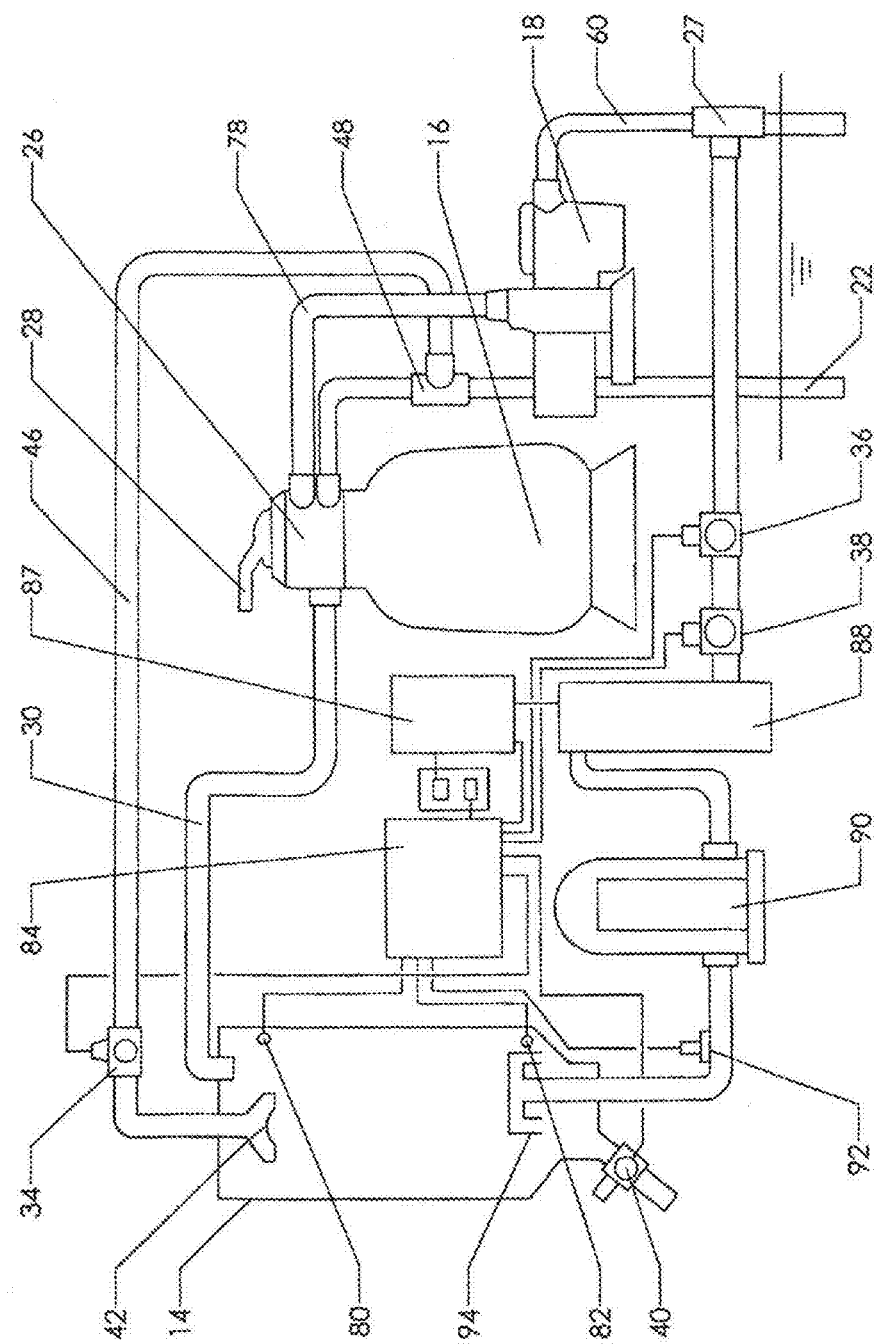
FIG. 8 is an elevation view, showing an alternate embodiment.

A preferred embodiment including several additional desirable features and modifications is shown in FIG. 8. Again, logic controller 84 is preferably used to partially or fully automate the process. When the backwash cycle is initiated, either the user or an automatic control device sets multi-port valve 26 to discharge through backwash line 30. First valve 34, second valve 36, and fourth valve 40 are all closed at this time. Third valve 38 is an emergency shut-off valve which ordinarily stays open.

Backwash line 30 leads to sediment retention tank 14. The backwash discharge fills the tank until high level sensor 80 indicates the appropriate level, at which point the backwash cycle is turned off. The reader will recall from the prior discussion that the backwash discharge contains a substantial quantity of suspended solids. These are preferably allowed to settle in sediment retention tank 14. Logic controller 84 detects the end of the backwash discharge and starts a tuning function. Selector valve 28 is returned to the normal pool filtration cycle.

A significant time after the end of the backwash discharge (such as between 8 and 20 hours), the reclamation process begins. By this time the solids within sediment retention tank 14 have settled to the bottom—below the level of recirculation intake 94. At this time the logic controller opens second valve 36 (recall that third valve 38 remains open throughout the cycle unless there is an emergency shut-off). This action connects recirculation intake 94 to the inlet side of pump 18. Water is drawn out of sediment retention tank 14. This water is then pulled through cartridge filter 90 (which traps any remaining sediments), UV chamber 88 (which bombards the water with ultraviolet light), through valves 38 and 26, then to tee 27, and into pump intake line 60.

Second valve 36 remains open until the water level within sediment retention tank 14 reaches the level of low level sensor 82. At this point second valve 36 closes. Next, fourth valve 40 opens for two minutes to allow the sediment in the bottom of the retention tank to flow out of the tank. About 30 seconds after fourth valve 40 opens, first valve 34 opens to provide flow through shower head 42. This action washes the tank and washes any remaining sediment out fourth valve 40. The washing continues for about 30 seconds. First valve 34 then closes. About 30 seconds later, fourth valve 40 closes. The process is then complete until the next "backwash" cycle is initiated.

UV controller 86 is provided to control UV chamber 88. A UV bombardment chamber is primarily required for commercial pools, so it should of course be viewed as optional. When in place, it is advisable to use third valve 38 as an emergency shut-off valve, in the event the UV controller detects a failure of the UV chamber, third valve 38 may be closed to stop the circulation.

Flow switch 92 is useful for detecting flow in the loop which returns water from the sediment retention tank to the pump. For example, it can be used to determine when UV chamber 88 should be activated.

The reader will thereby appreciate that the present invention provides a method for reclaiming and reusing a substantial portion of the waste water creating during the backwashing of a pool filter. The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

Having described my invention, I claim:

1. A method for reusing backwash water in a circulating pool filtration system, comprising:
   a. providing a pump having a pump intake line and a pump discharge line;
   b. providing a sand filter having a discharge line and a backwash line;
   c. providing a sediment retention tank;
   d. starting a backwash cycle in which flow in said sand filter is reversed and water forced through said sand filter by said pump flows out through said backwash line;
   e. routing said water flowing out through said backwash line to said sediment retention tank;
   f. stopping said backwash cycle after said retention tank is substantially full;
   g. starting a filtration cycle wherein water is forced through said sand filter by said pump and flows out through said discharge line;

h. allowing said water in said sediment retention tank to stand for a time sufficient to allow sediment within said water to settle to the bottom of said sediment retention tank;
i. providing a tank line in said sediment retention tank, said tank line having a tank line intake positioned to avoid said sediment in said bottom of said sediment retention tank and said tank line intake having an opening which is substantially upward facing;
j. connecting said tank line to said pump intake line; and
k. drawing said water within said sediment retention tank into said pump and back into said circulating pool filtration system.

2. A method for reusing backwash water as recited in claim 1, further comprising:
   a. providing a drain line in said sediment tank;
   b. providing a valve in said drain line; and
   c. after said water has been drawn out of said sediment tank, opening said valve in said drain line to remove said sediment from said sediment tank.

3. A method for reusing backwash water as recited in claim 1, further comprising:
   a. providing a shower head in said sediment retention tank; and
   b. routing water flow to said shower head to rinse said sediment retention tank.

4. A method for reusing backwash water as recited in claim 1, further comprising:
   a. providing a floating debris filter; and
   b. routing said water flowing out through said backwash line to said sediment retention tank through said floating debris filter before said water reaches said sediment retention tank.

5. A method for reusing backwash water as recited in claim 4, wherein said floating debris filter can be opened to remove floating debris trapped therein.

6. A method for reusing backwash water as recited in claim 5, further comprising opening said floating debris filter and removing floating debris trapped therein.

7. A method for reusing backwash water as recited in claim 4, wherein said floating debris filter comprises:
   a. an intake tube having a plurality of intake slits;
   b. a filter sock surrounding said intake tube; and
   c. a jacket surrounding said intake tube and said filter sock.

8. A method for reusing backwash water as recited in claim 7, wherein said floating debris filter further comprises:
   a. a first end where water flows into said floating debris filter;
   b. a second end where water flows out of said floating debris filter;
   c. a first union proximate said first end; and
   d. a second union proximate said second end.

9. A method for reusing backwash water as recited in claim 1, wherein at least some steps of said method are controlled by a logic controller.

10. A method for reusing backwash water in a circulating pool filtration system, comprising:
    a. providing a sand filter having a backwash line and a pump discharge line;
    b. providing a sediment retention tank;
    c. starting a backwash cycle in which flow in said sand filter is reversed and water forced through said sand filter flows out through said backwash line;
    d. routing said water flowing out through said backwash line to said sediment retention tank until said retention tank is substantially full;
    e. starting a filtration cycle wherein water is forced through said sand filter and flows out through said discharge line;
    f. allowing said water in said sediment retention tank to stand for a time sufficient to allow sediment within said water to settle to the bottom of said sediment retention tank and water to remain in the rest of said sediment retention tank; and
    g. removing said water remaining in the rest of said sediment retention tank without removing a significant amount of said sediment and introducing said removed water back into said circulating pool filtration system.

11. A method for reusing backwash water as recited in claim 10, further comprising:
    a. providing a drain line in said sediment tank;
    b. providing a valve in said drain line; and
    c. after said water has been removed from said sediment tank, opening said valve in said drain line to remove said sediment from said sediment tank.

12. A method for reusing backwash water as recited in claim 10, further comprising:
    a. providing a shower head in said sediment retention tank; and
    b. routing water flow to said shower head to rinse said sediment retention tank.

13. A method for reusing backwash water as recited in claim 11, further comprising:
    a. providing a shower head in said sediment retention tank; and
    b. routing water flow to said shower head to rinse said sediment retention tank.

14. A method for reusing backwash water as recited in claim 10, further comprising:
    a. providing a floating debris filter; and
    b. routing said water flowing out through said backwash line to said sediment retention tank through said floating debris filter before said water reaches said sediment retention tank.

15. A method for reusing backwash water as recited in claim 14, wherein said floating debris filter can be opened to remove floating debris trapped therein.

16. A method for reusing backwash water as recited in claim 15, further comprising opening said floating debris filter and removing floating debris trapped therein.

17. A method for reusing backwash water as recited in claim 14, wherein said floating debris filter comprises:
    a. an intake tube having a plurality of intake slits;
    b. a filter sock surrounding said intake tube; and
    c. a jacket surrounding said intake tube and said filter sock.

18. A method for reusing backwash water as recited in claim 17, wherein said floating debris filter further comprises:
    a. a first end where water flows into said floating debris filter;
    b. a second end where water flows out of said floating debris filter;
    c. a first union proximate said first end; and
    d. a second union proximate said second end.

19. A method for reusing backwash water as recited in claim 10, wherein at least some steps of said method are controlled by a logic controller.

* * * * *